(12) United States Patent
Rusek et al.

(10) Patent No.: US 12,483,305 B2
(45) Date of Patent: Nov. 25, 2025

(54) MULTIPLE SPATIAL DATA STREAMS VIA A RE-CONFIGURABLE REFLECTIVE DEVICE

(71) Applicant: Sony Group Corporation, Tokyo (JP)

(72) Inventors: Fredrik Rusek, Eslöv (SE); Jose Flordelis, Lund (SE); Kun Zhao, Malmö (SE); Olof Zander, Södra Sandby (SE); Erik Bengtsson, Eslöv (SE)

(73) Assignee: Sony Grop Corporation, Tokyo (JP)

( * ) Notice: Subject to any disclaimer, the term of this patent is extended or adjusted under 35 U.S.C. 154(b) by 132 days.

(21) Appl. No.: 18/038,314

(22) PCT Filed: Dec. 7, 2021

(86) PCT No.: PCT/EP2021/084546
§ 371 (c)(1),
(2) Date: May 23, 2023

(87) PCT Pub. No.: WO2022/122717
PCT Pub. Date: Jun. 16, 2022

(65) Prior Publication Data
US 2023/0421206 A1    Dec. 28, 2023

(30) Foreign Application Priority Data
Dec. 7, 2020    (SE) ................... 2051427-9

(51) Int. Cl.
*H04B 7/04*    (2017.01)
*H04B 7/0456*    (2017.01)
*H04B 7/06*    (2006.01)

(52) U.S. Cl.
CPC ....... *H04B 7/0481* (2023.05); *H04B 7/04013* (2023.05); *H04B 7/0482* (2013.01); *H04B 7/0691* (2013.01)

(58) Field of Classification Search
CPC ............. H04B 7/04013; H04B 7/0478; H04B 7/0482; H04B 7/0691
See application file for complete search history.

(56) References Cited

U.S. PATENT DOCUMENTS

| 4,035,631 A | * | 7/1977 | Day, Jr. ..................... | F21V 7/09 362/297 |
| 6,140,972 A | * | 10/2000 | Johnston ................ | H01Q 25/00 343/893 |

(Continued)

FOREIGN PATENT DOCUMENTS

CN    111093267 A    5/2020

OTHER PUBLICATIONS

International Search Report and Written Opinion from corresponding International Application No. PCT/EP2021/084546, mailed on May 25, 2022, 20 pages.

(Continued)

*Primary Examiner* — Dac V Ha
(74) *Attorney, Agent, or Firm* — Tucker Ellis LLP

(57) ABSTRACT

A method of operating a re-configurable reflective device, RRD (109) is provided. One or more wireless communication devices (102, 103, 104) are served by an access node (101) via the RRD (109) using multiple spatial data streams. The RRD (109) comprises multiple reflective elements (1094), the multiple reflective elements (1094) being grouped into a plurality of subsets (691-697), the multiple reflective elements (1094) of each subset (691-697) being re-configurable to provide multiple spatial filters. The method comprises obtaining, from the access node (101) and for each subset (691-697) of the plurality of subsets (691-697), a respective first indicator indicative of a respective entry of a respective first codebook and a respective second indicator indicative of a respective entry of a respective second codebook, and reconfiguring, for each subset (691-

(Continued)

697) of the plurality of subsets (691-697), the respective multiple reflective elements (1094) to provide a respective one of the multiple spatial filters, based on the respective entry of the respective first codebook and the respective entry of the respective second codebook.

18 Claims, 11 Drawing Sheets

(56) References Cited

U.S. PATENT DOCUMENTS

| 9,219,536 | B2* | 12/2015 | Zhou | H04B 7/0482 |
|---|---|---|---|---|
| 2010/0238913 | A1 | 9/2010 | Xia | |
| 2016/0211902 | A1* | 7/2016 | Park | H04L 5/0048 |
| 2017/0160527 | A1* | 6/2017 | Schulz | H01S 3/005 |
| 2019/0171221 | A1* | 6/2019 | Minorics | G08G 1/164 |
| 2020/0373660 | A1 | 11/2020 | Hsu | |
| 2022/0247091 | A1* | 8/2022 | Moon | H01Q 21/065 |

OTHER PUBLICATIONS

Mehdi Ganji et al., "A New Codebook Design for Analog Beamforming in Millimeter-wave Communication", Feb. 10, 2020, 31 pages.

Yaoshen Cui et al., "An Efficient CSI Acquisition Method for Intelligent Reflecting Surface-assisted mmWave Networks", Dec. 27, 2019, 6 pages.

Decai Shen et al., "Channel Feedback for Reconfigurable Intelligent Surface Assisted Wireless Communications", Apr. 15, 2020, 6 pages.

Keke Ying et al., "GMD-Based Hybrid Beamforming for Large Reconfigurable Intelligent Surface Assisted Millimeter-Wave Massive MIMO", IEEE Special Section on Emerging Trends, Issues and Challenges for Array Signal Processing and Its Applications in Smart City, vol. 8, Jan. 30, 2020, 10 pages.

Huawei et al., "Discussion on MU-CSI enhancements", 3GPP TSG RAN WG1 Meeting #98bis, R1-1910072, Oct. 14-20, 2019, 6 pages.

Office Action and Search Report from corresponding Swedish Application No. 2051427-9, mailed on Jul. 16, 2021, 9 pages.

Wei Wang et al., "Joint Beam Training and Positioning for Intelligent Reflecting Surfaces Assisted Millimeter Wave Communications", Sep. 8, 2020, 15 pages.

Changsheng You et al., "Fast Beam Training for IRS-Assisted Multiuser Communications", IEEE Wireless Communication Letters, vol. 9, No. 11, Nov. 2020, 5 pages.

Boyu Ning et al., "Channel Estimation and Hybrid Beamforming for Reconfigurable Intelligent Surfaces Assisted THz Communications", Dec. 25, 2019, 16 pages.

Sha Nu at al., "Beyond Massive MINO: The Potential of Data Transmission with Large Intelligent Surfaces", IEEE Transactions on Signal Processing, vol. 66, No. 10, May 15, 2018.

* cited by examiner

| Variable | Dimensions | Meaning |
|---|---|---|
| $y_p$ | Q x 1 | Input at subarray p |
| $z_p$ | Q x 1 | Output (reflection) at subarray p |
| $w_p$ | Q x 1 | Phase rotations |

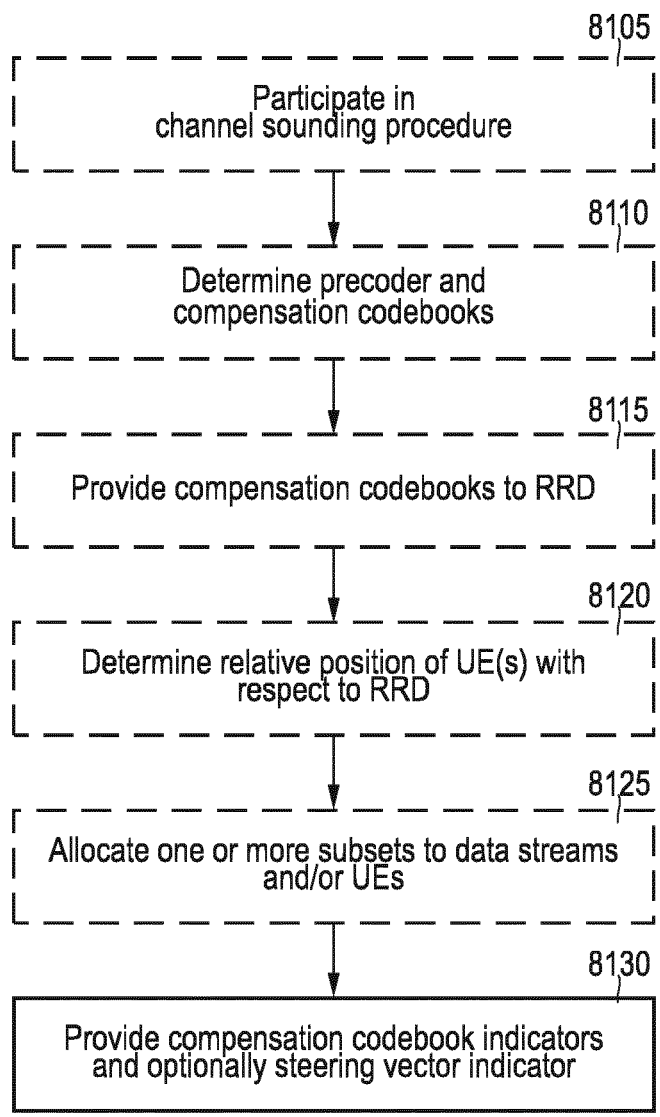

MULTIPLE SPATIAL DATA STREAMS VIA A RE-CONFIGURABLE REFLECTIVE DEVICE

TECHNICAL FIELD

Various examples of the disclosure generally relate to re-configurable reflective devices. Various examples specifically relate to techniques of configuring re-configurable reflective devices to support multiple spatial data streams.

BACKGROUND

In order to increase a coverage area for wireless communication, it is envisioned to use re-configurable reflective devices (RRD) to communicate with wireless communication devices (UEs).

RRDs are also sometimes referred to as reflecting large intelligent surface (LIS). See, e.g., Sha Hu, Fredrik Rusek, and Ove Edfors. "Beyond massive MIMO: The potential of data transmission with large intelligent surfaces." *IEEE Transactions on Signal Processing* 66.10 (2018): 2746-2758. The RRD can be implemented by an array of antennas that reflect incident electromagnetic waves/signals. The array of antennas can be passive. I.e., the array of antennas may not be able to change amplitude let alone provide amplification; but may provide a variable phase shift. An input spatial direction from which incident signals on a data carrier are accepted and an output spatial direction into which the incident signals are reflected can be re-configured, by changing a phase relationship between the antennas.

It has been observed that it can be difficult to support multiple spatial data streams by a single RRD, in particular for passive antenna arrays.

SUMMARY

Accordingly, a need exists for supporting multiple data streams by a single RRD.

This need is met by the features of the independent claims. The features of the dependent claims define embodiments.

A method of operating an RRD is provided. One or more wireless communication devices (UEs) are served by an access node via the RRD using multiple spatial data streams. The RRD includes multiple reflective elements (REs). The multiple REs are grouped into a plurality of subsets. The multiple REs of each subset are re-configurable to provide multiple spatial filters. The method includes obtaining, from the access node and for each subset of the plurality of subsets, a respective first indicator and a respective second indicator; the respective first indicator is indicative of a respective entry of a respective first codebook while the respective second indicator is indicative of a respective entry of a respective second codebook. The method also includes re-configuring, for each subset of the plurality of subsets, the respective multiple REs to provide a respective one of the multiple spatial filters. Said re-configuring is based on the respective entry of the respective first codebook and the respective entry of the respective second codebook.

A computer program or a computer-program product or a computer-readable storage medium including program code is provided. At least one processor can load and execute the program code. Upon loading and executing the program code the at least one processor performs a method of operating an RRD. One or more wireless communication devices (UEs) are served by an access node via the RRD using multiple spatial data streams. The RRD includes multiple reflective elements (REs). The multiple REs are grouped into a plurality of subsets. The multiple REs of each subset are re-configurable to provide multiple spatial filters. The method includes obtaining, from the access node and for each subset of the plurality of subsets, a respective first indicator and a respective second indicator; the respective first indicator is indicative of a respective entry of a respective first codebook while the respective second indicator is indicative of a respective entry of a respective second codebook. The method also includes reconfiguring, for each subset of the plurality of subsets, the respective multiple REs to provide a respective one of the multiple spatial filters. Said re-configuring is based on the respective entry of the respective first codebook and the respective entry of the respective second codebook.

An RRD is provided, wherein one or more wireless communication devices can be served by an access node via the RRD using multiple spatial data streams. The RRD includes multiple reflective elements, the multiple reflective elements being grouped into a plurality of subsets, the multiple reflective elements of each subset being re-configurable to provide multiple spatial filters. The RRD includes a control circuitry configured to obtain, from the access node and for each subset of the plurality of subsets, a respective first indicator indicative of a respective entry of a respective first codebook and a respective second indicator indicative of a respective entry of a respective second codebook. The control circuitry is further configured to re-configure, for each subset of the plurality of subsets, the respective multiple reflective elements to provide a respective one of the multiple spatial filters, based on the respective entry of the respective first codebook and the respective entry of the respective second codebook.

A method of operating an access node is provided. The access node serves one or more wireless communication devices via an RRD, using multiple spatial data streams. The RRD comprises multiple reflective elements, the multiple reflective elements being grouped into a plurality of subsets, the multiple reflective elements of each subset being re-configurable to provide multiple spatial filters. The method includes providing, to the RRD and for each subset of the plurality of subsets, a respective first indicator indicative of a respective entry of a respective first codebook and a respective second indicator indicative of a respective entry of a respective second codebook.

A computer program or a computer-program product or a computer-readable storage medium including program code is provided. At least one processor can load and execute the program code. Upon loading and executing the program code the at least one processor performs a method of operating an access node. The access node serves one or more wireless communication devices via an RRD, using multiple spatial data streams. The RRD comprises multiple reflective elements, the multiple reflective elements being grouped into a plurality of subsets, the multiple reflective elements of each subset being re-configurable to provide multiple spatial filters. The method includes providing, to the RRD and for each subset of the plurality of subsets, a respective first indicator indicative of a respective entry of a respective first codebook and a respective second indicator indicative of a respective entry of a respective second codebook.

An access node is provided. The access node is configured to serve one or more wireless communication devices via an RRD using multiple spatial data streams. The RRD comprises multiple reflective elements, the multiple reflective elements being grouped into a plurality of subsets, the multiple reflective elements of each subset being re-configurable to provide multiple spatial filters. The access node comprises a control circuitry configured to provide, to the RRD and for each subset of the plurality of subsets, a respective first indicator indicative of a respective entry of a respective first codebook and a respective second indicator indicative of a respective entry of a respective second codebook.

An RRD includes multiple reflective elements being grouped into a plurality of subsets. For each subset of the plurality of subsets, the reflective elements the respective subset are arranged on a respective circle.

A method of operating an RRD device is provided. One or more UEs are being served by an access node via the RRD using multiple data streams. The RRD includes multiple reflective elements. The multiple reflective elements are being grouped into a plurality of subsets. The multiple reflective elements of each subset are being reconfigurable to provide multiple spatial filters. The method includes selecting, for each subset of the plurality of subsets, a respective entry of a respective first codebook and a respective entry of a second codebook. At least the entries of the second codebooks are selected based on second indicators indicative of these entries of the second codebooks and obtained from the access node. Optionally, also the entries of the first codebooks can be selected based on first indicators indicative of these entries of the first codebooks obtained from the access node; otherwise the entries of the first codebooks can be selected based on a positioning procedure between the RRD and the one or more UEs. Then, it is possible to reconfigure, for each subset of the plurality of subsets, the respective multiple reflective elements to provide a respective one of multiple spatial filters, based on the respective selected entry of the respective first codebook and the respective selected entry of the respective second codebook.

A computer program or a computer-program product or a computer-readable storage medium including program code is provided. At least one processor can load and execute the program code. Upon loading and executing the program code the at least one processor performs a method of operating an RRD. One or more UEs are being served by an access node via the RRD using multiple data streams. The RRD includes multiple reflective elements. The multiple reflective elements are being grouped into a plurality of subsets. The multiple reflective elements of each subset are being reconfigurable to provide multiple spatial filters. The method includes selecting, for each subset of the plurality of subsets, a respective entry of a respective first codebook and a respective entry of a second codebook. At least the entries of the second codebooks are selected based on second indicators indicative of these entries of the second codebooks and obtained from the access node. Optionally, also the entries of the first codebooks can be selected based on first indicators indicative of these entries of the first codebooks obtained from the access node; otherwise the entries of the first codebooks can be selected based on a positioning procedure between the RRD and the one or more UEs. Then, it is possible to reconfigure, for each subset of the plurality of subsets, the respective multiple reflective elements to provide a respective one of multiple spatial filters, based on the respective selected entry of the respective first codebook and the respective selected entry of the respective second codebook.

An RRD is provided. One or more UEs are being served by an access node via the RRD using multiple data streams. The RRD includes multiple reflective elements. The multiple reflective elements are being grouped into a plurality of subsets. The multiple reflective elements of each subset are being reconfigurable to provide multiple spatial filters. The RRD comprises a control circuitry configured to select, for each subset of the plurality of subsets, a respective entry of a respective first codebook and a respective entry of a second codebook. At least the entries of the second codebooks are selected based on second indicators indicative of these entries of the second codebooks and obtained from the access node. Optionally, also the entries of the first codebooks can be selected based on first indicators indicative of these entries of the first codebooks obtained from the access node; otherwise the entries of the first codebooks can be selected based on a positioning procedure between the RRD and the one or more UEs. Then, it is possible that the control circuitry is configured to reconfigure, for each subset of the plurality of subsets, the respective multiple reflective elements to provide a respective one of multiple spatial filters, based on the respective selected entry of the respective first codebook and the respective selected entry of the respective second codebook.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 12 is a flowchart of a method according to various examples.

DETAILED DESCRIPTION OF THE DRAWINGS

Figure 1:
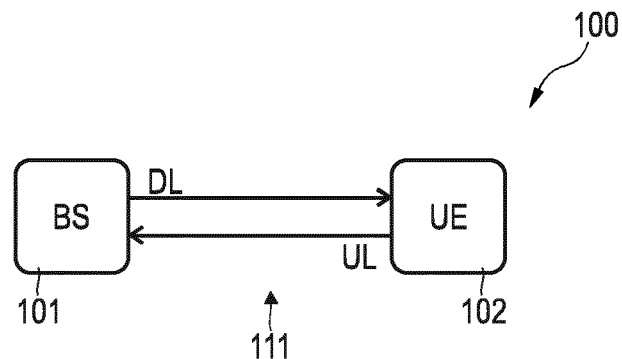
FIG. 1 schematically illustrates a communication system including a base station and a UE according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes. A wireless communication system includes a transmitter node and one or more receiver nodes. The nodes communicate on a data carrier. In some examples, the wireless communication system can be implemented by a wireless communication network, e.g., a radio-access network (RAN) of a Third Generation Partnership Project (3GPP)-specified cellular network (NW). In such case, the transmitter node can be implemented by an access node such as a base station (BS) of the RAN, and the one or more receiver nodes can be implemented by wireless communication devices (also referred to as user equipment, UE). Hereinafter, for sake of simplicity, various examples will be described with respect to an example implementation of the transmitter node by a BS and the one or more receiver nodes by UEs—i.e., to downlink (DL) communication; but the respective techniques can be applied to other scenarios, e.g., uplink (UL) communication and/or sidelink communication.

According to various examples, it is possible to use multi-antenna techniques. Multi-antenna techniques are used to enhance reliability and/or throughput of wireless communication. The BS uses multiple antennas. Thereby, a signal can be transmitted redundantly (diversity multi-antenna mode) along multiple spatial data streams or multiple signals can be transmitted on multiple spatial data streams (spatial multiplexing multi-antenna operational mode). The multiple independent data streams when using spatial multiplexing multi-antenna operational mode are sometimes also referred to as layers.

It is possible also to use beamforming: here, each spatial data stream can be defined by focusing the transmission energy for transmitting (transmit beam, TX beam) and/or the receive sensitivity for receiving (receive beam, RX beam) to a particular spatial direction. For beamforming, the process of identifying the appropriate beams is often referred to beam management.

Various techniques are related to using a spatial multiplexing multi-antenna operational mode including multiple independent spatial data streams that may include multiple signals, i.e., diversity multi-antenna mode.

According to various examples, an RRD is used to serve one or more UEs. The multiple spatial data streams can be implemented between the BS and the RRD. Each UE of the one or more UEs may be served by one or more of the multiple spatial data streams. Where a given UE is served by two or more spatial data streams, the data rate can be increased (multi-antenna gain).

As a general rule, various options are available for implementing the RRD. The RRD may include an antenna array. Here, antennas form re-configurable reflective elements. The RRD may include a meta-material surface. Here, sub-wavelength elements form the re-configurable reflective elements.

According to various examples described herein, the RRD may not be capable to be re-configured to adjust an amplitude of the reflected signal, e.g., the RRD may not implement an amplify-and-forward functionality; but be restricted to imposing a variable phase shift. The RRD may include a passive array of reflective elements, not able to amplify or generally change amplitude of the electromagnetic waves.

To forward an incident signal, the RRD may not decode the signal. The RRD may not translate an incident signal into the baseband. As a general rule, the RRD is configured to employ multi-antenna techniques. In particular, the RRD is reconfigurable to provide multiple spatial filters. Thereby, a spatial data stream between two nodes—e.g., the BS and the UE—can be diverted. Each one of the multiple spatial filters is associated with a respective input spatial direction from which incident signals on a respective data radio carrier are accepted, as well as with a respective output spatial direction into which incident signals are reflected or amplified by the RRD. Each output spatial direction is associated with a respective beam. Each spatial filter is achieved by imposing a certain phase shift onto the incident electromagnetic waves, at each respective re-configurable element. The RRD thereby implements beamforming.

There are many schools of thought for how RRDs should be integrated into 3GPP-standardized RANs. In an exemplary case, the NW operator has deployed the RRDs and is therefore in full control of the RRD operations. The UEs, on the other hand, may not be aware of the presence of any RRD, at least initially, i.e., it is transparent to a UE whether it communicates directly with the BS or via an RRD. The RRD essentially functions as a coverage-extender of the BS. The BS may have established a control channel with the RRD. According to another exemplary case, it might be a private user or some public entity that deploys the RRD. Further, it may be that the UE, in this case, controls RRD operations. The BS, on the other hand, may not be aware of the presence of any RRD and, moreover, may not have control over it/them whatsoever. The UE may gain awareness of the presence of RRD by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control channel with the RRD. The control channel can thus be on an auxiliary link.

In a further exemplary case, neither the UE nor the BS are aware of the presence of the RRD. The RRD may be transparent with respect to a communication between the UE and the BS on a data carrier. The RRD may gain awareness of the UE and/or the BS and re-configure itself based on information obtained from the UE and/or BS.

The three exemplary cases described above are summarized in TAB. 1 below.

TABLE 1

Scenarios for RRD integration into cellular NW.

| Scenario | Description | Explanation |
|---|---|---|
| A | BS-RRD control channel | BS controls the RRD and/or can obtain information from the RRD. A control channel is established between the BS and the RRD. The control channel can be on an auxiliary link different from the data carrier or implemented on the data carrier. The control channel can be on an auxiliary bandwidth part different from a data bandwidth part of the carrier used for communicating payload data via the RRD. Even more generally, the control channel can be on dedicated resources of the carrier used for communicating payload data via the RRD. |
| B | UE-RRD control channel | UE controls the RRD and/or can obtain information from the RRD. A control channel is established between the UE and the RRD. The control channel can be on an auxiliary link different from the data carrier. The control channel can be on an auxiliary bandwidth part different from the data bandwidth part. |
| C | Transparent RRD | RRD re-configures itself based on information obtained from the UE and/or BS. No control channel is established between the RRD and the UE or the BS. |

According to various examples disclosed herein, it is possible to implement a scenario A according to TAB. 1; some scenarios may also employ a UE-RRD control channel according to scenario B. Based on the BS-RRD control channel, it is possible to perform a channel sounding procedure. The BS and the RRD can participate in the channel sounding procedure. Here, reference signals may be transmitted on the control channel, e.g., from the BS to the UE or vice versa. Thereby, the channel between the RRD and the BS can be sounded, i.e., a channel matrix H can be determined. The particular implementation of such channel sounding procedure is not germane for the techniques described herein. Rather, in this regard, it is possible to use reference techniques generally known to the person skilled in the art.

According to various examples, it is possible to use multiple data streams. These multiple data streams can be used to serve one or more UEs. A typical example would be to serve multiple UEs using the multiple data streams.

Next, in TAB. 2, various options are described how it is possible to separate multiple data streams at the RRD.

TABLE 2

Various reference implementations for separating multiple spatial data streams at the RRD. Challenges and limitations of these reference implementations have been explained above.

| Option | Brief description of how to separate UEs | Example details |
|---|---|---|
| I | . . . in frequency | The re-configurable reflective elements of the RRD operate in a frequency-dependent manner. Such frequency-dependent operation can require complex hardware implementation. This is possible, but spectral efficiency may be reduced. Accordingly, such a reference implementation has certain disadvantages. |
| II | . . . in time | This is possible, but there is time sharing loss.. Accordingly, such a reference implementation has certain disadvantages. |
| III | . . . in polarization | Using multiple polarizations, the sum spectral efficiency as seen by the BS can be increased. However, this is limited to two data streams for two orthogonal polarizations. Accordingly, such a reference implementation has certain disadvantages. |
| IV | . . . by finding optimal phase shifts for each reconfigurable element for providing spatial division multiplexing | For RRDs having amplify-and-forward functionality or, at least, capability to attenuate the amplitude freely, it is possible to set the REs based on a simplified optimization problem. The disadvantage is a complex hardware required for each RE. In the examples described herein, the REs are passive, i.e., can impose a phase shift, but cannot change the amplitude. |

TABLE 2-continued

Various reference implementations for separating multiple spatial
data streams at the RRD. Challenges and limitations of these
reference implementations have been explained above.

| Option | Brief description of how to separate UEs | Example details |
|---|---|---|
| V | ... by finding optimal phase shifts for each re-configurable element for providing spatial division multiplexing (SDMA), without a capability to change the amplitude | Each RE of the RRD can be individually set to an appropriate phase shift, depending on the current channel, the count of spatial data streams, positions of one or more UEs with respect to the RRD, etc.. This allows separation of spatial data streams by spatial multiplexing (SDMA). It has been found that this can be challenging. Firstly, a codebook-based approach (defining the configuration of each re-configurable element) will in many scenarios fail, since the codebook becomes infeasibly large. The optimal set of phase delays depends on a presently unknown fashion on the outgoing angles. Every combination of reflection angles needs a separate entry in the codebook. If the RRD should serve, say, five UEs simultaneously using five spatial data streams, and the reflection directions are quantized into 100 angles, the codebook is of size $10^{10}$. For 10 UEs, we obtain $10^{20}$. Secondly, the entries of the codebook depend, in turn, on the channel between the BS and the RRD, so the codebook must be built after deployment. If the channel changes, the codebook must be redesigned. Thirdly, the entries of the codebook are not easy to determine and require heavy optimization. Accordingly, such a reference implementation has certain disadvantages. |

In view of these challenges and limitations of the reference implementations for separating multiple spatial data streams at the RRD, the inventors have conceived another concept of forwarding multiple spatial data streams via an RRD. Such concept relies on a modified SDMA approach, further developing the SDMA approach of TAB. 2, example V. According to various examples described herein, it is possible to separate multiple spatial data streams by partitioning the RRD. This means that the re-configurable reflective elements (REs) are grouped into subsets.

Such partitioning—according to the modified SDMA approach—can reduce the array gain if compared to scenario V of TAB. 2, i.e., if compared to the general per-RE SDMA approach. Such techniques have various advantages when compared to the reference implementations according to TAB. 2. Firstly, a larger number of data streams can be supported without reducing the spectral efficiency of each data stream (i.e., no time or bandwidth sharing); this is beneficial when compared to time or frequency or code division multiplexing (cf. TAB 2, options I and II). Secondly, a codebook-based approach using codebooks of limited size can be used, which is an advantage if compared to, e.g., TAB. 2: option IV. Thirdly, it is possible to determine the codebooks with high accuracy and limited computational efforts, e.g., using an optimization of limited complexity; this can be an advantage when compared to option IV. Fourthly, it is possible—at least in some scenarios—to maintain UE transparency, i.e., the UE does not need to be aware of it being served via the RRD, cf. TAB. 1, scenario I. Fifthly, the number of data streams supported is not limited to two; this is beneficial when compared to polarization division multiplexing (cf. TAB 2, option III). It would even be possible to integrate polarization multiplexing in the techniques described herein.

Then, to forward multiple spatial data streams using a codebook-based re-configuration of the RRD in combination with partitioning of the RRD, the following pre-conditions are assumed to be met: firstly, the BS is aware of the beam provides a strongest signal from the RRD to the UEs; secondly, the BS is aware of the channel between the BS and the RRD; and thirdly, there is a dedicated control channel between the BS and the RRD in which the BS can control the RRD (cf. TAB. 1, example I). The specific implementation of respective processes to obtain such information are out of scope of the subject disclosure. Very briefly, some examples will be given: for instance, the UE and the RRD could perform a relative positioning on a respective control channel, e.g., using a short-range communication protocol, and respective relative positions may be reported to the BS. It would also be possible that, both, the UE, as well as the RRD report their respective locations in a global coordinate system so that the BS can conclude on the relative positioning. It would be possible that RRD-beam identification toward the UE is embedded in the communication based on pilot signals—i.e., reference signals can be indicative of the RRD beam identity of the particular beam on which they are sent; this is similar to the BS-beam identification toward a UE in a non-RRD case. Furthermore, by communicating reference signals on a control channel between the BS and the RRD, it is possible to determine the channel between the BS and the RRD, more specifically it is possible to determine the channels between each one of the subsets of the RRD and the BS. For example, path loss and angle of arrival measurements could be performed. Still further, the control channel between the BS and the RRD can be established using a short-range communication protocols such as Bluetooth or Wi-Fi.

According to various examples, the RRD is partitioned, i.e., the REs of the RRD are grouped into a plurality of subsets. Each subset can provide multiple spatial filters, depending on the configuration of the respective REs of that subset.

According to these techniques, each subset can select/isolate a specific spatial data stream. Non-selected data streams can be scattered or even nullified in certain directions, at the respective subset.

This means that different subsets can apply different spatial filters. Different subsets can reflect the incident electromagnetic waves into different directions. Thereby, spatial data streams can be flexibly forwarded into different directions in the surrounding of the RRD.

According to the techniques described herein, the interference between the different spatial data streams can be low. A small codebook can be sufficient. Each subset can have its own codebook or codebooks.

According to examples, two codebooks are used per subset. A combination of the two codebooks then defines the spatial filter to be applied at the respective subset. The BS can then provide to the RRD, for each subset, a respective first indicator and a respective second indicator. The respective first indicators indicative of a respective entry of the respective first codebook of the subset; while the respective second indicators indicative of a respective entry of a respective second codebook of that same subset. Then, it is possible to reconfigure, for each subset, the respective multiple reflective elements to provide a respective spatial filter, based on the respective entries of the respective first codebook and the respective second codebook.

In other words, the BS indicates, to each subset, two codebook entries of two codebooks to apply. The two codebooks and their function are summarized in TAB. 3 below.

TABLE 3

A first codebook - hereinafter referred to as steering vector - codebook and a second codebook - hereinafter referred to as compensation codebook - are used per subset, to select and implement, for each subset of REs of the RRD, a respective spatial filter. Respective codebook indices can be provided by the BS to the RRD, e.g., using a control channel (cf. TAB. 1, example I).

| | |
|---|---|
| Steering vector codebook | Each subset can be assigned with a codebook that defines the steering vectors associated with all possible reflection directions (in view of the example above, the codebook is of size 100). Thereby, UEs arranged at different positions can be addressed. The steering vector codebook defines reflection directions at the respective RRD subset towards the UEs in the surrounding of the RRD.<br>The steering vector codebook can be fixedly predefined, e.g., according to a communications protocol or hardcoded into the RRD. No calibration phase, e.g., including a channel sounding procedure, is required.<br>As a general rule, the selection of an entry of the steering vector codebook of each subset can be either made at the RRD - e.g., if the reconfigurable reflective device and the one or more UEs perform a positioning procedure, e.g., without involvement of the base station; alternatively, it would be possible that the selection of an entry of the steering vector codebook of each subset is made at the base station and then the base station provides a respective indicator to the reconfigurable reflective device for selecting the appropriate entry. |

TABLE 3-continued

A first codebook - hereinafter referred to as steering vector - codebook and a second codebook - hereinafter referred to as compensation codebook - are used per subset, to select and implement, for each subset of REs of the RRD, a respective spatial filter. Respective codebook indices can be provided by the BS to the RRD, e.g., using a control channel (cf. TAB. 1, example I).

| | |
|---|---|
| Compensation codebook | The compensation codebook defines a phase compensation vector; each entry of said vector is applied at each of the REs of the respective subset.<br>Thereby, a selection from the multiple spatial data streams is defined at the RRD. In other words, the role of the phase compensation vector is to single out the specific spatial data stream of the signal incident from the BS that should be reflected in the already indicated direction according to the steering vector codebook.<br>The phase compensation vectors depend on the channel between the BS and the RRD, more specifically the BS and the particular subset of the REs of the RRD. These channels can - in typical deployment scenarios, e.g., wall-mounted RRD and fixed-position BS - be assumed to be static; then, it is possible to participate in a channel sounding procedure between the BS and the RRD in a calibration phase to sound the plurality of channels between the BS in each one of the subsets of the REs of the RRD. Thereby, in the calibration phase, it is possible to determine the compensation codebooks based on the channel sounding procedure and provide, to the RRD, the compensation codebooks for subsequent use when communicating payload data or after completion of the calibration phase (hereinafter, referred to as communication phase).<br>While said channel is static, the BS merely needs to indicate which of the vectors that should be applied, by providing a respective codebook index. |

At the BS, a specific precoding can be used that correlates with the determined compensation codebooks. The precoding depends on the channel between the BS and the RRD.

FIG. 1 schematically illustrates a communication system 100. The communication system includes two nodes 101, 102 that are configured to communicate with each other via a data carrier 111. In the example of FIG. 1, the node 101 is implemented by an access node, more specifically a BS, and the node 102 is implemented by a UE. The BS 101 can be part of a cellular NW (not shown in FIG. 1).

As a general rule, the techniques described herein could be used for various types of communication systems, e.g., also for peer-to-peer communication, etc. For the sake of simplicity, however, hereinafter, various techniques will be described in the context of a communication system that is implemented by a BS 101 of a cellular NW and a UE 102.

As illustrated in FIG. 1, there can be DL communication, as well as UL communication. Various examples described herein particularly focus on the DL communication from the BS 101 to the UE 102. However, similar techniques may be applied to UL communication from the UE 102 to the BS 101.

The UE 102 and the BS 101 can communicate on the data carrier 111. For instance, the data carrier 111 may have a carrier frequency of not less than 20 GHz or even not less than 40 GHz. The data carrier 111 may be via an RRD (not illustrated in FIG. 1).

Figure 2:
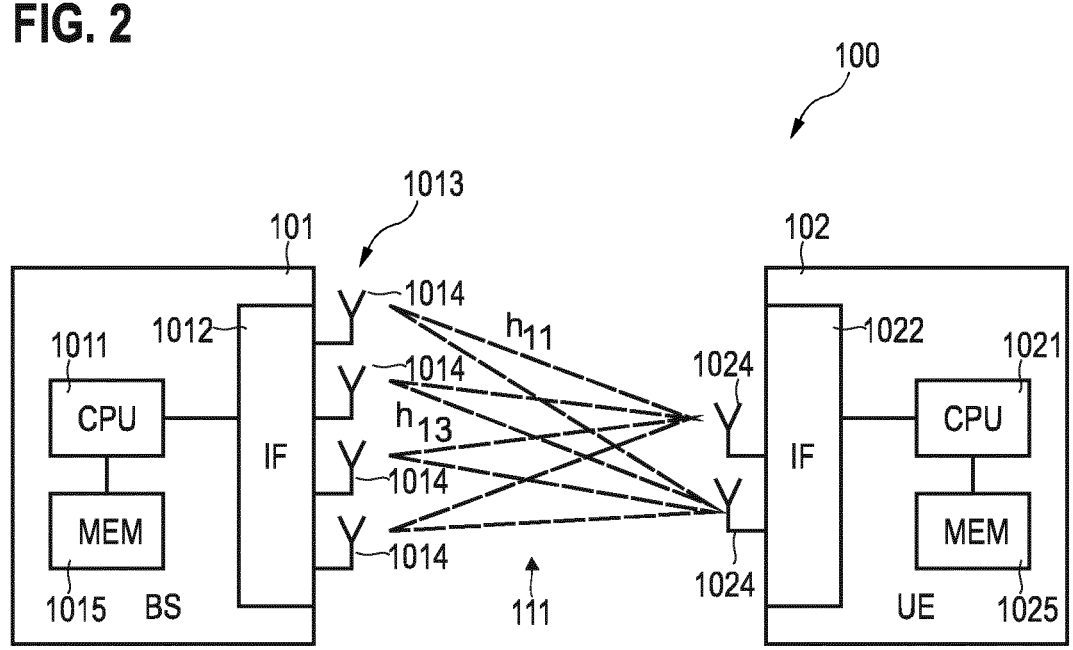
FIG. 2 schematically illustrates details of the communication system according to FIG. 2.

FIG. 2 illustrates details with respect to the BS 101. The BS 101 implements an access node to a communications network, e.g., a 3GPP-specified cellular network. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: providing a codebook index to a RRD; participating in a channel sounding procedure of one or more channels between the BS 101 and the RRD; transmitting and/or receiving (communicating) data on the data carrier 111; performing an optimization to determine a codebook for use at the RRD; providing the codebook to the RRD; etc.

FIG. 2 also illustrates details with respect to the UE 102. The UE 102 includes control circuitry that is implemented by a processor 1021 and a non-volatile memory 1025. The processor 1021 can load program code that is stored in the memory 1025. The processor can execute the program code. Executing the program code causes the processor to perform techniques as described herein, e.g.: transmitting and/or receiving (communicating) payload data on the data carrier 111, e.g., via an RRD (not shown in FIG. 2); participating in a positioning procedure for determining a relative position of the UE 102 with respect to an RRD, e.g., in the case of line-of-sight signal propagation (which is only one option considered in this disclosure); etc.

FIG. 2 also illustrates details with respect to communication between the BS 101 and the UE 102 on the data carrier 111. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the BS.

The interfaces 1012, 1022 can each include one or more TX chains and one or more receiver chains. For instance, such RX chains can include low noise amplifiers, analogue to digital converters, mixers, etc. Analogue and/or digital beamforming would be possible. Thereby, phase-coherent transmitting and/or receiving (communicating) can be implemented across the multiple antennas 1014, 1024. Multi-antenna techniques can be implemented.

By using a TX beam, the direction of signals transmitted by a transmitter of the communication system is controlled. Energy is focused into a respective direction or even multiple directions, by phase-coherent superposition of the individual signals originating from each antenna 1014, 1024. Thereby, a spatial data stream can be directed. The spatial data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

Figure 3:
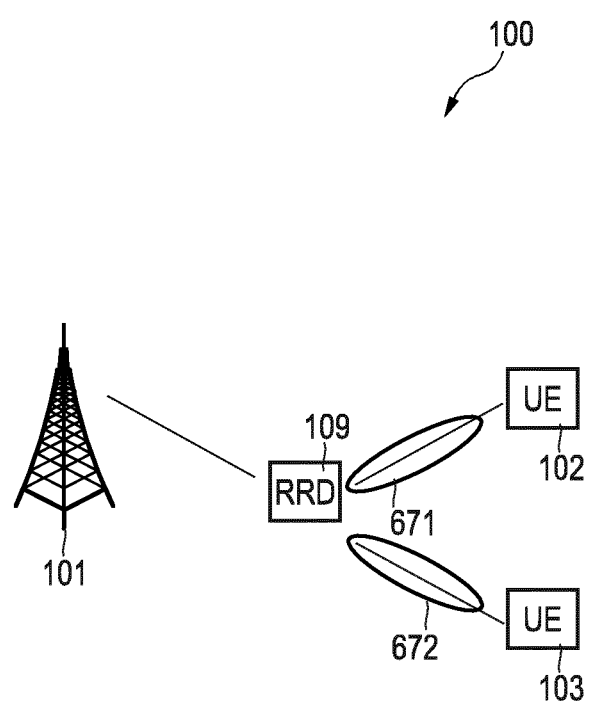
FIG. 3 schematically illustrates details of a communication system including a base station, two UEs, as well as an RRD according to various examples.

FIG. 3 illustrates aspects with respect to communicating via an RRD 109. Two UEs 102, 103 are served by the BS 101 via an RRD 109. Different steering vector define beams 671-672 that are directed to the UE 102 and the UE 103, respectively. Each UE 102, 103 can be served by the BS 101 using one or more respective spatial data streams between the BS 101 and the RRD 109 (the spatial data streams are not illustrated in FIG. 3 for the sake of simplicity).

Figure 4:
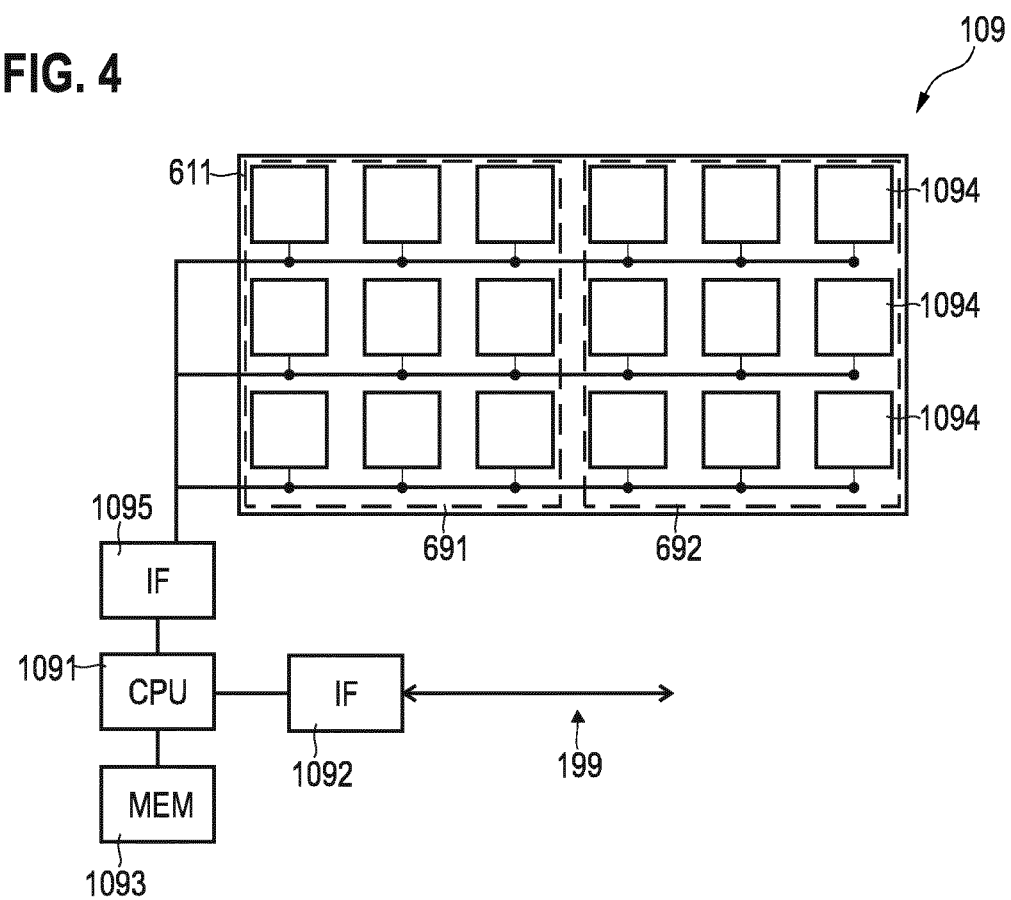
FIG. 4 schematically illustrates details with respect to the RRD according to various examples.

FIG. 4 illustrates aspects in connection with the RRD 109. The RRD 109 includes an array of REs 1094—e.g., antennas or meta-material unit cells—each imposing a respective configurable phase shift when reflecting incident electromagnetic waves. The array of REs 1094 in the illustrated example is passive; i.e., the REs 1094 may not be able to change the amplitude of the electromagnetic waves. This array of REs 1094 forms a reflective surface 611. Typically, antennas can impose gradually varying phase shifts; while meta-material unit cells may, in some examples, be configured to provide only a set of phase shifts with a higher degree of quantization if compared to antennas, e.g., a either one of two phase shifts, e.g., such as +90° or −90° or 0° and +180° ("1-bit setting").

Each RE 1094 can locally provide a respective phase shift, i.e., each RE 1094 may be individually configured.

The re-configuration of REs 1094 defines respective spatial filters that are associated with spatial directions into which incoming electromagnetic waves are reflected, i.e., on a macroscopic level. This defines the spatial direction into which an outgoing beam 671-672 (cf. FIG. 3) is reflected.

As illustrated in FIG. 4, the REs 1094 are grouped into subsets 691, 692. This grouping is also referred to as partitioning the REs 1094 of the RRD 109. This grouping can be a logical grouping; i.e., may not be reflected in any hardware implementation. For example, different groupings are possible using the same hardware. It would even be possible that some REs 1094 belong to multiple subsets, i.e., that the subsets overlap. The grouping may be defined with respect to codebooks that are provided. Each subset 691-692 can provide a respective spatial filter. Different subsets 691-692 can provide the same or different spatial filters. The REs 1094 of each subset 691-692 can be coherently addressed to implement a respective spatial filter.

While in the scenario of FIG. 4 each subset 691, 692 includes a count of nine REs 1094, as a general rule, the count of REs per subset 691, 692 can be larger or smaller.

While FIG. 4 illustrates two subsets 691, 692, as a general rule, more than two subsets can be defined by the respective partition of the array of REs 1094. For example, the count of subsets may be predefined—e.g., in a calibration phase—depending on a maximum count of spatial data streams to be supported by the RRD 109. It would also be possible that the count of subsets, or generally the partitioning, is dynamically changed when communicating payload data.

The RRD 109 includes an antenna interface 1095 and a processor 1091 that can activate respective spatial filters one after another, e.g., in accordance with a re-configuration timing that defines the dwell time per spatial filter.

Further, there is a communication interface 1092 such that communication on an auxiliary link 199 can be established between the RRD 109 and, e.g., the BS 101 and/or the UE 102. Example implementations of the auxiliary link 199 include, e.g., a Wi-Fi protocol or a Bluetooth protocol. Out-of-band signaling may be used with respect to the communication of payload data via the REs. The auxiliary link 199 could also be implemented using the same communication protocol used for communication payload data; e.g., a separate bandwidth part may be used for the auxiliary link 199. In-band signaling may be used. Different bandwidth parts may be used for the communication of payload data via the REs and the auxiliary link. A wired connection would be possible. A control channel with, e.g., the BS 101 and/or the UE 102 can be established on the auxiliary link 199. The auxiliary link 199 can be used to assist the beam management procedure at the RRD 109. It would be possible to implement a channel sounding procedure and/or a positioning procedure.

The processor 1091 can load program code from a non-volatile memory 1093 and execute the program code. Executing the program code causes the processor to perform techniques as described herein, e.g.: re-configuring each one of the REs 1094 to provide a selected one of multiple spatial filters, e.g., on subset-level; determining a configuration of each one of the REs 1094; selecting a spatial filter by accessing one or more codebooks, e.g., the codebooks according to TAB. 3; obtaining indices indicating entries of the one or more codebooks; applying a partition into the subsets 691-692, participating in a channel sounding procedure with the BS 101; participating in a positioning procedure with one or more UEs 102, 103; etc.

FIG. 4 illustrates—as an example—a cartesian array of REs 1094. This is only one option. In other examples, the REs can be arranged in concentric circles (as will be explained in further detail in connection with FIG. 10). Also, the BS 101 can have a circular antenna array, wherein the center axis of the BS and of the RRD 109 are aligned. Also, an angular offset would be possible.

Next, operation of the communication between the BS 101 and the UEs 101-102 using the RRD 109 will be explained.

Figure 5:
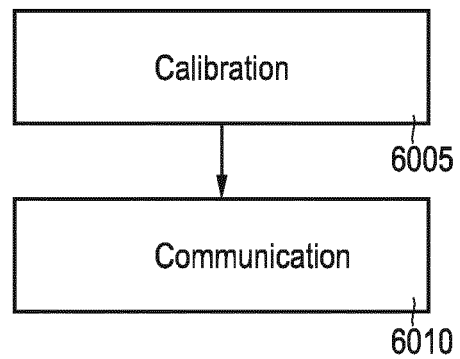
FIG. 5 is a flowchart of a method according to various examples.

FIG. 5 is a flowchart illustrating an example method. FIG. 5 is a flowchart illustrating two phases of the operation. The BS 101 and the RRD 109 can operate differently during these two phases.

Box 6005 denotes a calibration phase. The calibration phase of box 6005 precedes a communication phase at box 6010 where payload data is communicated via the RRD 109. For example, the calibration phase of box 6005 can be part of an installation/deployment of the RRD 109 and optionally the BS 101 at a given site, e.g., a VR gaming environment.

Details with respect to the calibration phase of box 6005, as well as the communication phase of box 6010 are discussed below in connection with FIG. 6.

Figure 6:
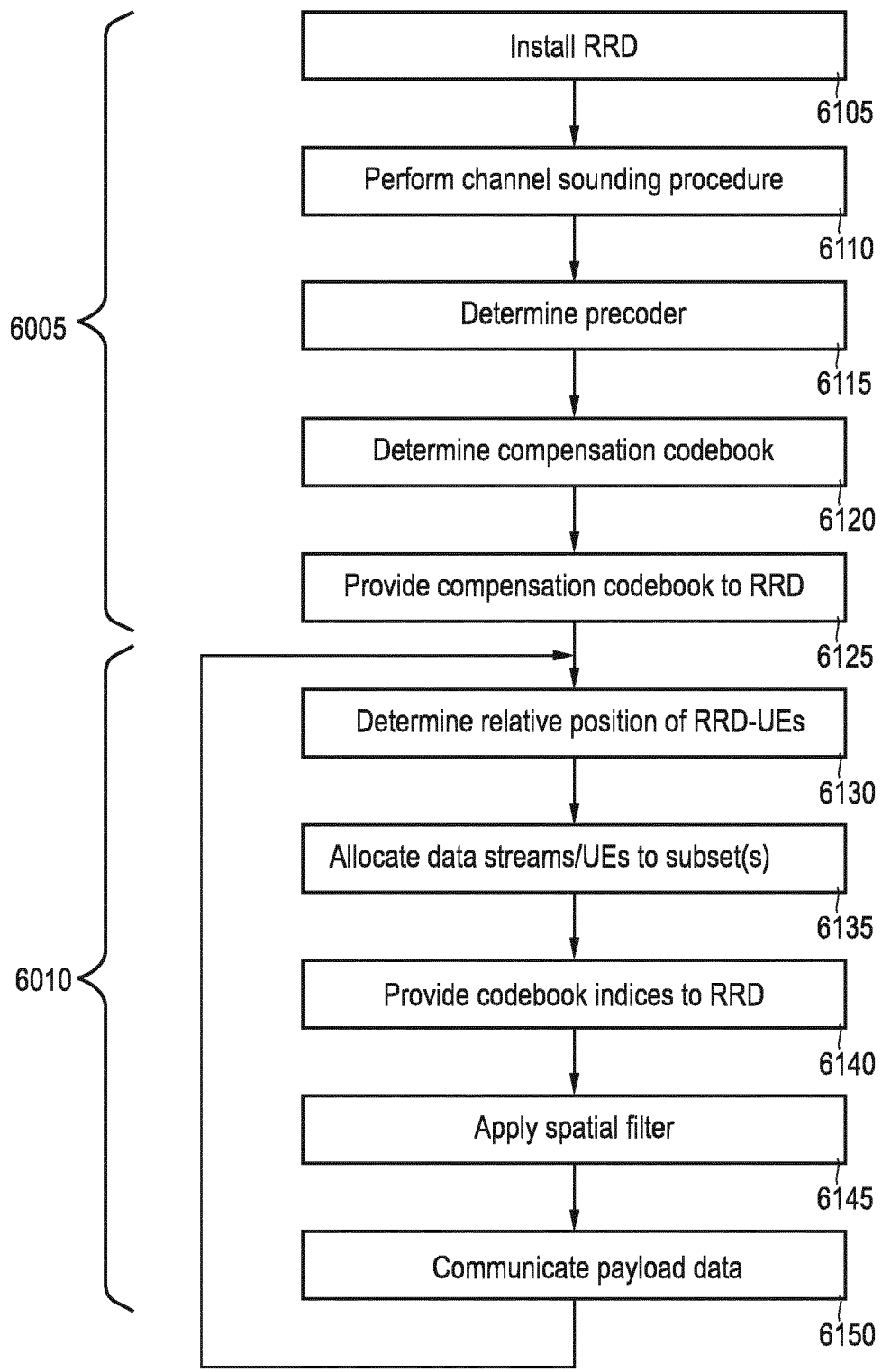
FIG. 6 is a flowchart of a method according to various examples.

FIG. 6 is a flowchart of a method according to various examples. The method of FIG. 6 illustrates details of the method of FIG. 5 according to an example implementation.

At box 6105, the RRD 109 is deployed. Optionally the BS 101 is deployed. This includes setting up, at certain locations, the RRD 109 and optionally the BS 101. In particular, the relative position between the RRD 109 and the BS 101 may be fixed.

At box 6105, a partitioning of the RRD 109 can be defined, i.e., the REs 1094 of the RRD 109 are grouped into a count of P subsets. The grouping of the REs 1094 means that multiple REs 1094 are included in each subset 691, 692. This can be in accordance with predefined design rules, e.g., a supported maximum count of spatial data streams. Typically, the maximum count of spatial data streams can depend on a count of REs. Each subset may have a predetermined minimum count of REs, e.g., not less than 10 or 100 REs.

In some examples, it would even be possible that the partitioning of the RRD 109 is dynamically changed or selected from multiple candidate partitionings. For example, the particular partitioning—e.g., defined by the count of subsets and/or the grouping of the REs 1094 into the subsets—may even be re-selected during the communication phase of box 6010. Decision criteria could be count of UEs being served, count of spatial data streams used, etc.

At box 6110, a channel sounding procedure between the RRD 109 and the BS 101 occurs. This can include communicating reference signals (RSs). Both, the RRD 109 and the BS 101 participate in the channel sounding procedure, e.g., by transmitting and/or receiving reference signals and/or providing respective feedback. For example, reference signals can be communicated on the auxiliary link 199. The BS 102 thus obtains the channel, H, more specifically, the channel for each subset, $H_p$, p=1 . . . P.

The BS 101 can have knowledge regarding the count of reflection directions, e.g., the BS 101 can have knowledge regarding the steering vector codebook, cf. TAB. 3. For example, the BS 101 can inform the RRD 109 regarding the steering vector codebook; or vice versa.

At box 6115, the BS 101 determines a precoder G to use during the communication phase. The role of this precoder is to allow each subset 691-692 to select one specific layer from the BS signal for further reflection.

Then, based on the channels $H_p$ for each subset and the precoder G, the compensation vectors are determined for all subsets, to populate the compensation codebooks, at box 6120.

The compensation codebooks are then provided to the RRD 109, together with an indication of the particular subset associated with each compensation codebook, at box 6125. Using the compensation codebooks, it is possible to isolate different spatial data streams during the communication phase of box 6010.

The steering vector codebooks are predefined and remain fixed during the calibration phase of box 6005. It would be possible that the RRD 109 provides the steering vector codebooks to the BS 101; or vice versa.

Up to now, the calibration phase of box 6005 has been described. Next, the communication phase of box 6010 will be described. This corresponds to the operations during payload data communication.

At box 6130, the relative position of the UEs being served by the BS 101 with respect to the RRD 109 is being determined. For example, it is possible to acquire information about which reflection directions—outgoing beam indices of the RRD 109, cf. beams 671, 672 in FIG. 3—that should be used to reach the UEs. Conventional beam management procedures can be used.

At box 6135, it is possible to allocate one or more subsets 691-692 to each spatial data stream being used by the BS 1012 to serve the one or more UEs 102-103.

In particular, it is possible to flexibly map data streams to subsets, as well as to flexibly map UEs to spatial data streams. For instance, each spatial data stream may be mapped to a single subset or to multiple subsets. A UE may be served by one or more data streams.

To give a concrete example, the allocation could be as follows: For a first subset, the respective steering vector codebook indicator defines a reflection direction towards a given UE and the respective compensation codebook indicator defines selection of a first spatial data stream (the first spatial data stream is then associated with the given UE, i.e., carries signals encoding payload data directed to the given UE); for a different, second subset, the respective steering vector codebook indicator defines a second reflection direction towards the same given UE, but the respective compensation codebook indicator selects a different spatial data stream. Thereby, this given UE can be served via two data streams that can be spatially separated at the UE, e.g., because they have different angles-of-arrival. For instance, one of the two data streams may propagate non-line-of-sight, the other one may propagate line-of-sight. Thereby, the overall data rate can be increased. Alternatively, two data streams can be used to transmit payload data redundantly, i.e., a diversity scheme. The net result is an increased array gain and, consequently, larger user data rates.

Each data stream can, in some scenarios, have two sub-streams, associated with different polarizations.

There can be various decision criteria taken into consideration when allocating subsets to spatial data streams; and some of these decision criteria are summarized below in TAB. 4.

TABLE 4

Various options for allocating subsets to data streams and/or subsets to UEs. Decision criteria described in TAB. 4 can be combined with each other or with further decision criteria, to thereby form cumulative decision criteria.

| | Brief explanation of decision criterion | Example details |
|---|---|---|
| I | Rate requirement of associated UE | For instance, if a given UE currently being served by the BS requires a high data rate, it would be possible to prioritize a respective spatial data stream. This can be implemented by allocating more than a single subset to the respective spatial data stream. Thereby, a higher quality - e.g., reduced quantization effects, reduced side lobes, higher array gain - can be achieved, because more REs participate in the reflection. |
| II | Count of data streams | For instance, if the count of data streams is smaller than the count of subsets, it is possible to allocate, at least on average, more than a single subset to each subset data stream. All or a majority of the REs of the RRD can thereby utilized. Multiplexing gain can be increased. |
| III | Count of subsets | For example, if the count of subsets is larger than the count of data streams, it is possible to allocate, at least on average, more than a single subset to each data stream. |
| IV | Count of UEs | It is possible to determine the count of spatial data streams based on the count of UEs. Each UE can be served using at least one spatial data stream. Multi-antenna diversity or multi-antenna spatial multiplexing would be possible.<br>A UE with low rate requirement may only be allocated with a single spatial data stream and a single subset, while a UE with high requirement may be allocate with more than a single subset and optionally many subsets (i.e. stronger signal allows for a higher modulation index or a longer range). |

The allocation of box 6135 can be implemented at the BS 101; the RRD 109 is not required to be involved.

Then, at box 6140, the codebook indices of the compensation codebook are provided to the RRD 109. The compensation vector singles out the transmission layer intended for user k.

In typical implementations, the steering vector indices of the steering vector codebook are also provided, by the BS 101, to the RRD 109. The beam index, which corresponds to a steering vector, controls the reflection direction. There can be other scenarios in which the RRD 109 selects the appropriate steering vectors for each subset autonomously, e.g., when it has knowledge of the relative positioning of the UEs in its surrounding.

At, box 6145, the respective spatial filters are applied at each subset. This can include multiplying the steering vector—as indicated by the steering vector codebook—and the compensation vector—as indicated by the compensation codebook—for each RE of a respective subset and reconfiguring each RE accordingly.

Then, payload data can be transmitted by the BS 101 via the RRD 109 using the multiple spatial data streams to the one or more UEs 102-103, at box 6150.

As illustrated in FIG. 6, boxes 6130-6150 can be reiterated. In particular, it is possible to repeatedly determine the relative positioning of the one or more wireless communication devices with respect to the RRD 109, e.g., at the BS 101 or the RRD 109. Also, the allocation of box 6135 can be dynamically updated from time to time. For instance, it would be possible that, at a first point in time, the codebook indicators of the steering vector codebook and the codebook indicators of the compensation codebook of two or more of the subsets define different spatial filters (i.e., select different spatial data streams, possibly for different UEs); while, at a later, second point in time, the steering vector codebook indicators and the compensation codebook indicators of the same two or more subsets define the same spatial filter (i.e., select the same spatial data stream for the same UE).

By such techniques, various effects can be achieved. All UEs (1 . . . K) can receive interference free signals simultaneously. The amount of required signaling is kept very low, as the BS needs merely to indicate two codebook indices (cf. TAB. 2); for example, the number of codebook indices to signal can be as low as the count of UEs. The MIMO multiplexing gain is maintained, since all UEs are simultaneously served. There is a, potential, power loss of K, since the antenna array is partitioned; in some implementations, this power loss can be substantially smaller.

Next, an example mathematical description of the techniques above, is provided. This will be discussed in connection with FIG. 7 and FIG. 8 and FIG. 9.

Figure 7:
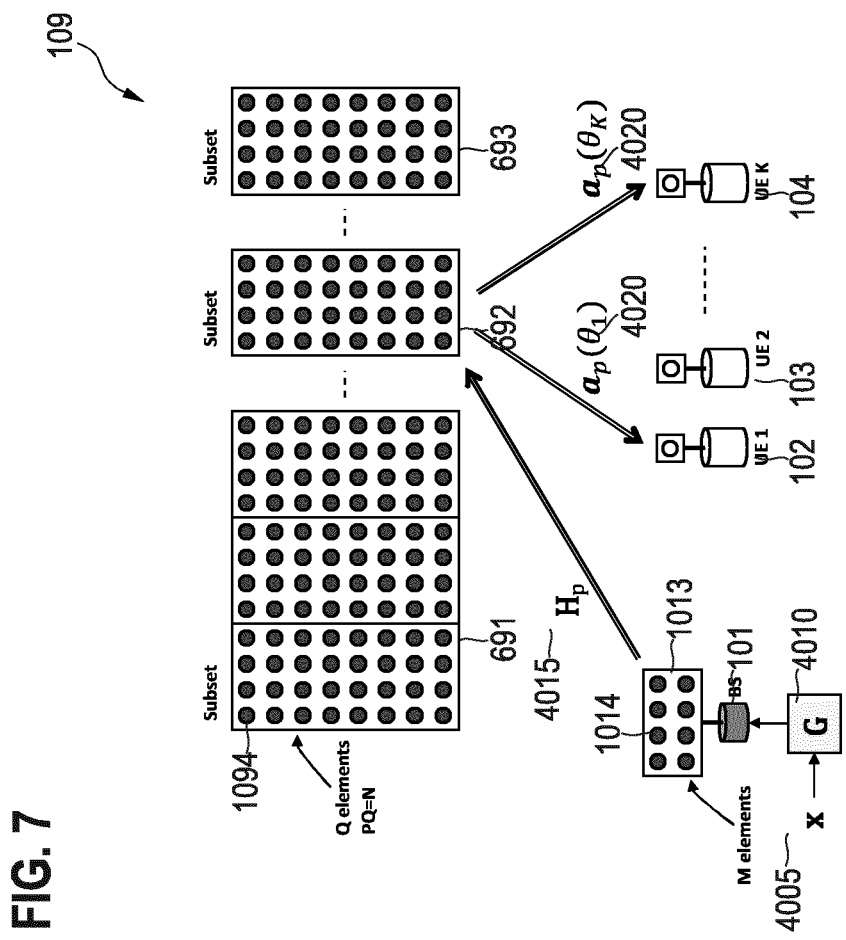
FIG. 7 schematically illustrates a system model of a communication system including a base station, multiple UEs, as well as an RRD according to various examples.

Assume an M antenna-port BS (i.e., having M antenna elements 1014, cf. FIG. 2; FIG. 7), K single antenna-port UEs 102-104, and an RRD 109 with N reflective elements 1094. Assume a grouping of the N reflective elements into P subsets, each containing Q=N/P reflective elements 691-693. In the absence of noise, the signal from the BS 101 to subset p can be expressed as $$y_p = H_p G x$$

where x is the transmitted K×1 data symbol vector, G is an M×K BS precoder matrix, and $H_p$ is the channel having a dimensionality of Q×M. The channel is determined based on a channel sounding procedure, cf. FIG. 6: box 6110. The index p counts the subsets 1 . . . P formed by the REs of the RRD. Likewise, the output signal at each of the K UEs 102-104 due to subset p can be expressed by a vector r:

$$r = \begin{bmatrix} a_p(\theta_1) \\ \vdots \\ a_p(\theta_K) \end{bmatrix} z_p$$

where $a_p(\theta_k)$ is a steering vector at subset p, of dimension 1×Q, in the direction (solid angle) $\theta_k$ towards user k, and $z_p$ is the reflected signal at subset p.

Note that here it is assumed for sake of simplicity that the number of spatial data streams K equals the number of UEs. As a general rule, there can be more spatial data streams than UEs. But it would even be possible that a spatial data stream is shared between two UEs, e.g., for broadcasted or point-to-multipoint payload data.

Figure 8:
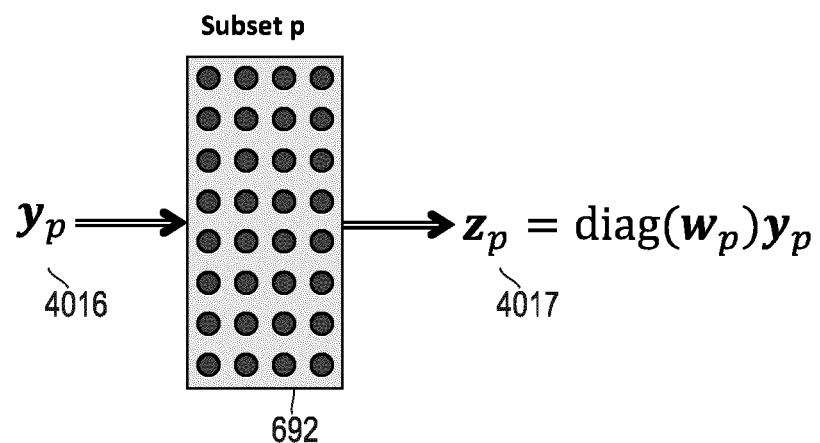
FIG. 8 schematically illustrates operation of a subset of reflective elements of the RRD according to various examples.

The reflected signal $z_p$ can, in turn, be expressed as $$z_p = \mathrm{diag}(w_p) y_p$$

where $w_p$ is a Q×1 vector describing the phase rotations—i.e., defining the spatial filters provided by each subset—and diag(•) defines a diagonal matrix with its argument along the main diagonal. This defines the operation at each subset, as illustrated in FIG. 8. The input signal $y_p$, denoted 4016, and the output signal $z_p$, denoted 4017, are defined by the spatial filter $w_p$.

Based on the equations above, one arrives at the following input-output relation $$r = \sum_{p=1}^{P} \begin{bmatrix} a_p(\theta_1) \\ \vdots \\ a_p(\theta_K) \end{bmatrix} \mathrm{diag}(w_p) H_p G x. \quad (1)$$

The overall system model is illustrated in FIG. 7. The precoding at 4010 using matrix G applied to the input signal vector x—at 4005, e.g., encoding payload data, cf. box 6150 of FIG. 6—is shown.

Eq. (1) describes the input-output relationship for downlink data from the BS to the UE. I.e., $r=r_{DL}$.

The RRD 109 includes $p=1 \ldots P$ subsets; here three subsets 691-693 are shown. Only the channel $H_p$ to subset 692 is illustrated, 4015. The steering vectors are illustrated at 4020.

RRDs 109 are typically passive, i.e., do not amplify; accordingly, a constraint is that all elements of the vectors $w_p$ have, without loss of generality, unit magnitude; that is, they are complex exponentials (phasors).

Based on the above input-output relation of Eq. (1), the objective can be formulated as follows: Find $\{G, w_1, \ldots, w_P\}$ such that $r=\mathrm{diag}(f)x$. In other words, find a BS precoder matrix G and spatial filters for each subset of REs 1094 at the RRD 109, so that interference between the various UEs 102-104 is reduced or zero. Here, f is a K×1 vector representing signal strengths for the K users; the presence of "diag(f)" eliminates inter-user interference.

However, subject to the constraint that all the elements of the vectors $w_p$ shall have unit magnitude, to find good (in the sense of capacity, SNR, etc.) spatial filters $w_p$, i.e., to find a good configuration of the RRD 109, is a non-deterministic polynomial-time hard problem, since it entails optimization over complex exponentials which is not a compact set.

There are many possibilities to solve this problem. One example solution of sufficient accuracy for selecting $\{w_p\}$ will be described below.

To reduce complexity, two codebooks that define together the possible vectors w p are used (cf. TAB. 2). The first codebook includes entries defining first contributions to the spatial filters $w_p$ defining reflection directions aligned with positions of the multiple UEs in line-of-sight case or generally aligning beams so that communication with the UEs is good; this is the steering vector codebook. The second codebook includes entries defining second contributions to the phase rotations $w_p$ associated with selecting different spatial data streams associated with the multiple UEs; this is the compensation codebook.

Next, it is described how to construct/populate the codebooks at subset p. The steering vector codebooks for each subset 691-693 are related only to the reflection directions at the RRD, and can described as $$A_p = \{a_p(\varphi_m), 1 \leq m \leq S,\} \quad (2)$$

where S is a design parameter, $\{\varphi_m\}$ is a set of beam directions from the RRD, and $a_p(\varphi_m)$ is a vector of size 1×Q. In what follows, it is assumed that the beam directions $\{\varphi_m\}$ are selected so densely that one can assume that $\theta_k \cong \varphi_{m'}$ for some value m'. This is illustrated at 4020 in FIG. 7.

As a general rule, the steering vector codebook can be fixed and predefined.

As a further general rule, the selection of entries from the steering vector codebook can occur at the BS 101, e.g., when the BS 101 tracks the position of each UE 102-104 with respect to the RRD 109. It would also be possible that the selection of entries from the steering vector codebooks is made at the RRD 109.

The compensation codebook is of the form $$C_p = \{c_{pq}, 1 \leq q \leq K,\} \quad (3)$$

where each vector in the compensation codebook has, at least in some examples, unit magnitude elements.

To specify the entries in these codebooks that should be applied at subset p, the BS 101 provides, to the RRD 109, the codebook indices ($m^p$, $q^p$), one for each of the two codebooks. The operation at a given subset 692 is illustrated in FIG. 8. Then, the spatial filter at each subset is obtained as $$w_p = a_p(\varphi_{m^p})^H \odot c_{pq^p}, \quad (4)$$

wherein $\odot$ is Hadamard product, i.e., element-wise product. Substituting Eq. (4) into Eq. (1) yields $$r = \sum_{p=1}^{P} \begin{bmatrix} a_p(\theta_1) \\ \vdots \\ a_p(\theta_K) \end{bmatrix} \mathrm{diag}(a_p(\varphi_{m^p})^H) \mathrm{diag}(c_{pq^p}) H_p G x. \quad (5)$$

Under the assumption that the steering vectors $a_p(\theta_k)$ are mutually orthogonal over the index k, Eq. (5) becomes $$r = \Sigma_{p=1}^{P} = R_{Q,I(p)} \mathrm{diag}(c_{pq^p}) H_p G x \quad (6)$$

where $R_{Q,k}$ is a K×Q matrix where row k is all ones, and the other rows have the property that they have mean 0 as Q grows large. The indicator variable I(p) is defined as the targeted user index of the p-th subset. Next, the precoder matrix G is discussed; a discussion of how to generate $c_{pq^p}$ follows afterwards.

The precoder matrix G can be selected as the solution to the following optimization problem $$G = \underset{X}{\mathrm{argmin}} \sum_{p=1}^{P} \min_{\gamma_p \geq \gamma_{min}} \| |H_p X| - \gamma_p 1 \|^2 \text{ such that } \|X\|^2 = P_T \quad (7)$$

where $P_T$ is a measure of transmit power, and |Z| is a matrix of the same size as Z, however having elements defined by the magnitudes of the elements of Z. 1 is matrix having all elements set to value "1".

Further, $\gamma_{min}$ is a parameter used for tradeoff purposes and is related to gain. The parameter may be predefined or may be set differently in different implementations. With a large $\gamma_{min}$, one obtains a large array gain, at the expense of possibly larger interference. $\gamma_{min} > 0$ prevents trivial solution X=0.

To put Eq. (7) into words: G is determined such that the matrices $H_p G$ have elements that have as equal magnitudes as possible. In other words, the goal function of the optimization penalizes differences between elements of each matrix $H_p G$ (i.e., the matrix obtained from multiplying the precoder matrix defining precoding at the BS with the channel matrix of each subset) for all subsets p; the respective reference value is defined by $\gamma_p$ and can, in general, vary from subset to subset. It would also be possible that $\gamma_p$ is the same for all p, i.e., $\gamma_p = \gamma_0, \forall p$.

Other formulations of the goal function optimizations are also possible that penalize, but they should somehow take into consideration that the matrices $|H_p G|$ should have as equal magnitudes across all their elements as possible.

The goal function of Eq. (7) can be solved as an iterative numerical optimization algorithm. Various optimization algorithms can be used, e.g., descent methods, evolutionary methods, pattern search methods, to name just a few.

Based on the precoder matrix, or more generally based on the channels $H_p$, it is then possible to determine the compensation codebook $C_p$. Let $b_{pk}$ denote the kth column of $H_pG$. The kth compensation vector in $C_p$ is $c_{pk}=b_{pk}^H/\|b_{pk}\|$. With that, we have $\mathrm{diag}(c_{pI(p)})H_pG=(R_{Q,I(p)})^T \mathrm{diag}(z)$ for some vector z that can be interpreted as a gain.

Inserting this into Eq. (5), and assuming that the minimum cost of the optimization problem stated above is 0, yields $$r=\Sigma_{p=1}^P R_{Q,I(p)}(R_{Q,I(p)})^T\mathrm{diag}(z)x. \quad (8)$$

Invoking the properties of $R_{Q,I(p)}$, one obtains $$r = \sum_{p=1}^{P} z_{I(p)} E_{p,I(p)} x$$

where the matrix $E_{p,I(p)}$ has the following properties (under assumption that the minimum cost of the optimal solution to the optimization problem stated above is 0):

Element (I(p),I(p)) is Q

All other elements at row I(p) and column I(p) are zero (under assumption that the steering vectors to different users are mutually orthogonal).

All other elements are small, in the sense that after division with Q, they tend to 0 as Q grows large.

From this, it follows that UE k receives $$r_k = Q \sum_{p:I(p)=k} z_{I(p)} x_k,$$

that is, interference free transmission, with an array gain proportional to the number of antennas at each subset devoted to user k. 'Interference free' holds true as long as the UEs are spatially separated; UEs spatially close to each other need to be separated via FDD, TDD or CDD, which are efficient only for this case, i.e. when sharing a beam.

Figure 9:
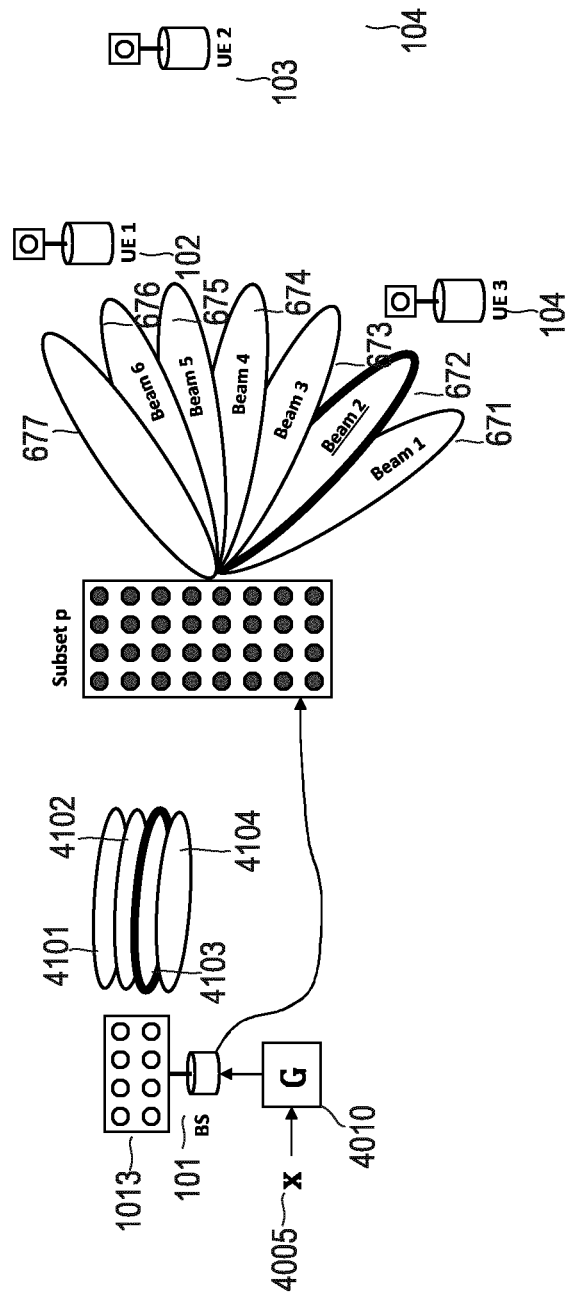
FIG. 9 schematically illustrates multiple spatial data streams and multiple beams used for communicating data between a base station and the UE via the RRD according to various examples.

For example, FIG. 9 illustrates the selection of the spatial data stream 4103 from a total of four spatial data streams 4104 to be forwarded to the UE 104 using the output beam 672—there is a total of seven beams 671-677, corresponding to seven entries in the steering vector codebook. In FIG. 9, this means: $m^p=2$, i.e., use the second beam from codebook $A_p$ to steer the reflection only towards UE 104; as well as $q^p=3$, i.e., use the third compensation vector from codebook $C_p$ to only reflect the third layer 4103. As a further example: If $m^p=6$ and $q^p=1$, then UE 102 would be served by subset p.

Above, various functional features have been explained in connection with operating the RRD to support multiple spatial data streams. The techniques described herein are flexible in the sense that they support various geometries of reflective surfaces of the RRD, e.g., different arrangements of REs such as antennas or meta-material unit cells. As a general rule, the particular geometry of the REs of the RRD and their grouping into subsets is not germane for the functioning of the techniques. This also applies to the arrangement of the antennas of the BS. For instance, various geometries can be considered in the optimization according to Eq. (7); here, the channel matrices $H_p$ will generally depend on the arrangement of the REs of the RRD, as well as the arrangements of the antennas of the BS.

Hereinafter, an example geometry of the RRD will be described that has certain benefits, in particular, an analytical solution to the optimization according to Eq. (7) can be possible, in particular when combined with a specific configuration of antenna elements of the BS.

Figure 10:
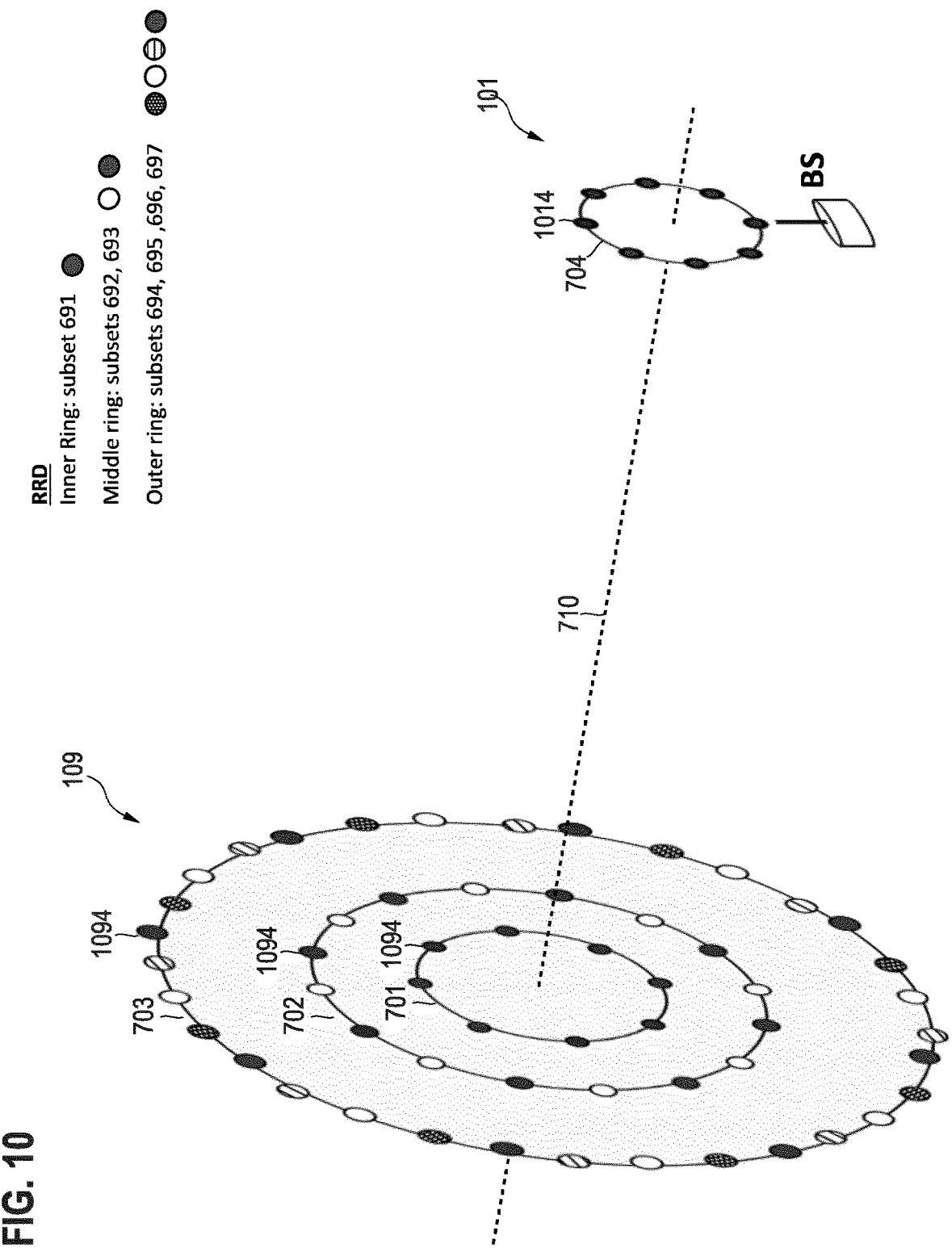
FIG. 10 schematically illustrates an example structural implementation of reflective elements of the RRD as well as antenna elements of the base station according to various examples.

FIG. 10 schematically illustrates an arrangement of the REs 1094 of the RRD 109, as well as of the antenna elements 1014 of the BS 101.

As illustrated in FIG. 10, the RRD 109 again includes multiple REs 1094 that are grouped into a plurality of subsets 691-697. For each one of the subsets 691-697, the REs of the respective subset 691-697 are arranged on a respective circle 701-703, having different diameters. For instance, in the illustrated scenario of FIG. 10, the REs 1094 of the subset 691 are arranged on an inner ring/circle 701, the REs 1094 of the subsets 692-693 are arranged on a middle circle 702, and the REs 1094 of the subsets 694-697 are arranged on the outer circle 703.

As illustrated, the circles 702 and 703 thus accommodate reflective elements 1094 grouped into multiple respective subsets 692-693, as well as 694-697. The reflective elements 1094 of each one of the subsets 692-693 are alternatingly arranged on the circle 702; likewise, the reflective elements 1094 of the subsets 694-697 are alternatingly arranged on the circle 703. More specifically, the reflective elements of each subset 691-697 are evenly spaced on the respective circle 701-703. Thereby, for the REs 1094 of each one of the subsets 691-697, a b-fold rotational symmetry with respect to the center point of each circle 701-703 of the respective subset 691-697 is obtained, where b is the count of REs 1094 per respective subset 691-697.

For example, it would be possible that the count of REs per circle 701-703 is a multiple of some base integer number Q. The partitioning of the RRD 109 into the subsets 691-697 is to let Q antennas from each circle 701-703 constitute one subset 691-697. All subsets 701-703 thus include the same count of REs 1094. This is generally optional; it would also be possible that different subsets 701-703 include different counts of Res 1094.

The circles 701-703 are concentrically arranged; a center axis 710 is illustrated, as illustrated in the scenario of FIG. 10, also the antenna elements 1014 of the BS 101 are arranged on a respective circle 704 that is concentrically arranged with respect to the center axis 710.

By such a configuration, orthogonal angular momentum electromagnetic modes can be selected for the propagation of the electromagnetic waves. It is possible to analytically solve the optimization according to Equation (7). Very briefly, this is because the channel matrices of the subsets 692-693, as well as 694-697 of each circle 702-703 including more than a single subset are identical due to the rotational symmetry. Details will be described below.

The effect of such layout is that the channel matrix H thereby has the form $$H=F_Q \Sigma F^*_M$$

where $F_Q$ denotes the DFT matrix of size Q, and * is complex conjugation. The matrix E has all elements equal to zero, except along its 0, K, 2K, . . . , (Q/K−1)K lower diagonals. This matrix allows one to trivially solve the optimization problem of Eq. (7) by selecting G as any K columns from $F_M$. The compensation vectors can be taken as K columns from $F^*_Q$. The gains, z are related to the entries of Σ. To maximize those, the K columns from $F_M$ should be selected as the K columns in which the largest elements of Σ are found. The columns of $F^*_Q$ are the rows of Σ in which these largest elements are to be found. The gain $z_k$ is the largest element of column k in Σ. In case this is a complex number, the compensation vector should be phase rotated to make it real, so that coherent combining at the receiver side is obtained.

In cases where the BS 101 and the RRD 109 are not lined up concentrically with respect to a common center axis 710, some minor residual inter-user interference will still be present. This can be straightforwardly handled by incorporating a zero-forcing precoder into G.

Figure 11:
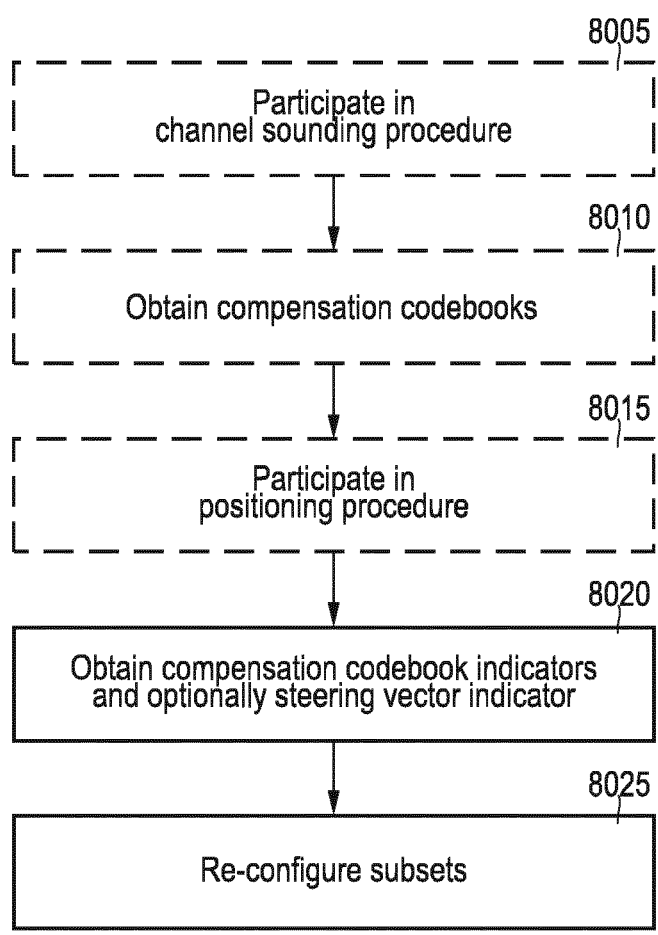
FIG. 11 is a flowchart of a method according to various examples.

FIG. 11 is a flowchart of a method according to various examples. For example, the method of FIG. 11 could be implemented by an RRD such as the RRD 109 discussed above. It would be possible that the method of FIG. 11 is implemented by the processor 1091 upon loading respective program code from the memory 1093. The RRD can communicate with an access node and optionally with one or more UEs, e.g., via auxiliary radio carriers and respective control channels. Optional boxes are marked with dashed lines in FIG. 11.

At optional box 8005, the RRD participates in the channel sounding procedure with the access node. Here, reference signals can be transmitted and/or received on an auxiliary radio carrier (such as the auxiliary radio carrier 199 as discussed in connection with FIG. 4). Upon participating in the channel sounding procedure, the method proceeds to box 8010.

At optional box 8010, compensation codebooks are obtained for each one of multiple subsets. Each subset includes multiple REs. The compensation codebooks specify settings for each respective RE. Details of the compensation codebook have been discussed above in connection with TAB. 3. The compensation codebook is also discussed above in connection with Equation (3). At box 8010, the set of indices $c_{pq}$ can be obtained.

Box 8005 and box 8010 can be part of the calibration phase as discussed in connection with box 6005 of FIG. 5.

At box 8015, the RRD may participate in the positioning procedure with one or more UEs that are arranged in the surrounding area of the RRD and served or potentially being served via the RRD. In other examples, such positioning may be implemented at the access node, transparent to the RRD.

Next, at box 8020, the RRD obtains, from an access node, as well as for each subset of multiple subsets, a respective compensation codebook indicator indicative of a respective entry of the compensation codebook.

It is optionally possible that the RRD also obtains, from the access node, a respective steering vector codebook index for each subset. In other examples, the selection of the entries of the steering vector codebook can be made autonomously at the RRD device based on the relative positioning between the RRD and the one or more UEs in its surrounding, based on the positioning procedure of box 8015. For instance, the access node may indicate which specific UEs are being served via the RRD and then the RRD can check whether the respective positioning procedure has been performed.

Based on the selected entries of the respective steering vector codebook and the respective compensation codebook, the REs of each subset are reconfigured at box 8025. Then, payload data can be communicated between the access node and one or more UEs.

FIG. 12 is a flowchart of a method according to various examples. For example, the method of FIG. 12 could be implemented by an access node, e.g., the BS 101 discussed above. It would be possible that the method of FIG. 12 is implemented by the processor 1011 upon loading respective program code from the memory 1015. The access node can communicate with one or more UEs via an RRD. The access node can also communicate with the RRD, e.g., via an auxiliary radio carrier in a respective control channel. Optional boxes are marked with dashed lines in FIG. 12.

At optional box 8105, the access node participates in a channel sounding procedure with the RRD. Box 8105 is interrelated with box 8005 of FIG. 11.

At optional box 8110, the precoder matrix is determined, and based on the precoder matrix, the compensation codebooks for each subset are determined. Respective techniques have been described in connection with Eq. (7).

Then, the compensation codebooks are provided to the RRD, at optional box 8115. Box 8115 is thus interrelated with box 8010 of FIG. 11.

At optional box 8120, the positions of one or more UEs that are being served via the RRD are determined, with respect to the RRD. This allows one to select the appropriate entries of the steering vector codebooks, for each subset. The outgoing beams can be selected, cf. FIG. 9, beams 671-677.

For this, a mapping between data streams—subsets—UEs can be used and the respective mapping can be determined at box 8125, by allocating, for each one of one or more UEs being served via the RRD, one or more subsets to at least one spatial data stream associated with the respective UE.

Details with respective decision criteria to be considered at box 8125 have been discussed above with respect to TAB. 4.

Next, at box 8130, the compensation codebook indices and optionally steering vector indices are provided to the RRD. Box 8130 thus is inter-related with box 8020.

Summarizing, an SDMA technique to separate multiple spatial data streams at the RRD has been described. Here, the REs of the RRD are not modifying the amplitude of the electromagnetic waves. The REs can be passive elements that only impose a variable phase shift. The RRD is divided into subsets. This generally can result in a tendency to reduce the array gain; in particular if compared to a full superposition of the RRD precoders without partitioning (which, ideally would require amplitude and phase shifts to each RE; for passive REs only capable of providing a phase shift, it is a mathematically complex challenge).

The techniques described herein can be transparent to the UE. The techniques described herein can use the full bandwidth and the RDD does not need to switch beams with high rate, allowing for low power and no need of synchronizing the RRD with a timing reference of a communication protocol used by the BS and the UE to communicate payload data via the RRD.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various scenarios have been discussed according to which the BS provides the steering vector codebook indices to the RRD. For instance, such a scenario does not require that the UE is aware of the presence of the RRD. However, other scenarios are conceivable and according to such scenarios, it would be possible that a positioning procedure is performed between the RRD and each UE of the one or more UEs. Then, the RRD can be aware of the relative positioning of the one or more UEs and its surrounding and may, autonomously, without involvement of the BS, select the appropriate steering vector codebook index for each one of its subsets. Still, the BS can inform the RRD regarding the compensation codebook index for each subset.

For further illustration, above various scenarios have been described in connection with downlink data transmitted from the BS via the RRD towards the UE. For reciprocal spatial streams, it is possible to use respective precoding and RRD beams also for uplink data from the UE via the RRD to the BS.

For downlink data $x_{DL}$, Eq. 1 provides:

$$r_{DL} = \sum_{p=1}^{P} \begin{bmatrix} a_p(\theta_1) \\ \vdots \\ a_p(\theta_K) \end{bmatrix} \mathrm{diag}(w_p) H_p G x_{DL}$$

This can be used to determine the input-output relationship for uplink data as:

$$r_{UL} = \left[ \sum_{p=1}^{P} \begin{bmatrix} a_p(\theta_1) \\ \vdots \\ a_p(\theta_k) \end{bmatrix} \mathrm{diag}(w_p) H_p G \right]^T x_{UL}$$

Note that with this approach, there are no additional constraints imposed on the UEs.

For still further illustration, examples have been described in which subsets of REs are disjointed, i.e., each RE is grouped into a single subset. As a general rule, it would be possible that subsets overlap. Thereby, the array gain can be potentially increased.

The invention claimed is:

1. A method of operating a re-configurable reflective device (RD) wherein one or more wireless communication devices are served by an access node via the RD using multiple spatial data streams, wherein the RD comprises multiple reflective elements, the multiple reflective elements being grouped into a plurality of subsets, the multiple reflective elements of each subset being re-configurable to provide multiple spatial filters, wherein the method comprises:
   obtaining, from the access node and for each subset of the plurality of subsets, a respective first indicator indicative of a respective entry of a respective first codebook and a respective second indicator indicative of a respective entry of a respective second codebook, and
   re-configuring, for each subset of the plurality of subsets, the respective multiple reflective elements to provide a respective one of the multiple spatial filters, based on the respective entry of the respective first codebook and the respective entry of the respective second codebook.

2. The method of claim 1, further comprising:
   in a calibration phase, participating in a channel sounding procedure between the access node and the RD to sound a plurality of channels between the access node and each one of the plurality of subsets, and obtaining, from the access node upon participating in the channel sounding procedure and for each one of the multiple subsets, the respective second codebook.

3. The method of claim 2, wherein the first codebooks are predefined and remain fixed throughout the channel sounding procedure.

4. A method of operating an access node, the access node serving one or more wireless communication devices via a re-configurable device (RRD) using multiple spatial data streams, wherein the RD comprises multiple reflective elements, the multiple reflective elements being grouped into a plurality of subsets, the multiple reflective elements of each subset being re-configurable to provide multiple spatial filters, wherein the method comprises:
   providing, to the RD and for each subset of the plurality of subsets, a respective first indicator indicative of a respective entry of a respective first codebook and a respective second indicator indicative of a respective entry of a respective second codebook.

5. The method of claim 4, further comprising:
   in a calibration phase, participating in a channel sounding procedure between the access node and the RD to sound a plurality of channels between the access node and each one of the plurality of subsets,
   determining the second codebooks based on the plurality of channels, and
   providing the second codebooks to the RD.

6. The method of claim 5, wherein said determining of the second codebooks comprises an optimization, wherein a goal function of the optimization penalizes differences between elements of a matrix obtained from multiplying a precoder matrix defining precoding at the access node with a channel matrix associated with each one of the subsets and optionally maximize a gain at the RD.

7. The method of claim 4, further comprising:
   for each one of the one or more wireless communication devices, allocating one or more subsets of the plurality of subsets to at least one spatial data stream of the multiple spatial data streams associated with the respective wireless communication devices.

8. The method of claim 7, wherein said allocating is based on at least one of a count of the one or more wireless communication devices, a count of the multiple subsets, or rate requirements associated with each one of one or more wireless communication devices.

9. The method of claim 4, wherein the entries of the first codebook define reflection directions at the RD towards the one or more wireless communication devices.

10. The method of claim 4, wherein the entries of the second codebook define a selection from the multiple spatial data streams at the RD.

11. The method of claim 9, wherein the first indicator for a first subset of the multiple subsets defines a first reflection direction towards a first one of the one or more wireless communication devices, wherein the second indicator for the first subset of the multiple subsets defines the selection of a first spatial data stream, wherein the first indicator for a second subset of the multiple subsets defines a second reflection direction towards the first one of the one or more wireless communication devices, wherein the second indicator for the second subset of the multiple subsets defines the selection of a second spatial data stream different from the first spatial data stream.

12. The method of claim 4, wherein, at a first point in time, the first indicators and the second indicators of two or more of the plurality of subsets define different spatial filters of the multiple spatial filters.

13. The method of claim 12, wherein, at a second point in time different than the first point in time, the first indicators and the second indicators of two or more of the plurality of subsets define the same spatial filter of the multiple spatial filters.

14. A re-configurable device (RRD), comprising multiple passive reflective elements being grouped into a plurality of subsets, wherein, for each subset of the plurality of subsets, the reflective elements the respective subset are arranged on a respective circle; and wherein the reflective elements of each subset of the plurality of subsets are evenly spaced on the respective circle.

15. The RD of claim 14, wherein the respective circles of the plurality of subsets are concentrically arranged.

16. The RD of claim 14, wherein all subsets include the same count of reflective elements.

17. The RD of claim 14, wherein the respective circles of at least two subsets of the plurality of subsets have different diameters.

18. A communication system comprising the RD of claim 14 and an access node comprising multiple antenna elements arranged on a circle.

* * * * *